(12) United States Patent
Kraus (10) Patent No.: US 11,758,926 B2
(45) Date of Patent: Sep. 19, 2023

(54) SETTING DEGREE OF MACERATION BASED ON FORAGE NUTRITIVE VALUES

(71) Applicant: DEERE & COMPANY, Moline, IL (US)

(72) Inventor: Timothy J. Kraus, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 526 days.

(21) Appl. No.: 16/934,584

(22) Filed: Jul. 21, 2020

(65) Prior Publication Data

US 2022/0022493 A1     Jan. 27, 2022

(51) Int. Cl.
| | |
|---|---|
| *A23N 17/00* | (2006.01) |
| *A23K 30/15* | (2016.01) |
| *A23K 50/10* | (2016.01) |
| *A23K 10/30* | (2016.01) |

(52) U.S. Cl.
CPC .............. *A23K 30/15* (2016.05); *A23K 10/30* (2016.05); *A23K 50/10* (2016.05); *A23N 17/008* (2013.01)

(58) Field of Classification Search
None
See application file for complete search history.

(56) References Cited

U.S. PATENT DOCUMENTS

| | | |
|---|---|---|
| 4,333,956 A | 6/1982 | Juengst, Jr. et al. |
| 5,036,652 A | 8/1991 | Schmittbetz et al. |
| 5,152,127 A | 10/1992 | Koegel et al. |
| 2008/0145476 A1 | 6/2008 | Beck |
| 2009/0092715 A1 | 4/2009 | Beck |
| 2016/0309656 A1 | 10/2016 | Wilken et al. |
| 2018/0078945 A1* | 3/2018 | Ludwig .................. B02C 25/00 |
| 2018/0164769 A1 | 6/2018 | Warmington et al. |

FOREIGN PATENT DOCUMENTS

| | | |
|---|---|---|
| CA | 1233544 A | 3/1988 |
| GB | 939629 A | 10/1963 |
| WO | WO2015011476 A1 | 1/2015 |

(Continued)

OTHER PUBLICATIONS

Extended European Search Report and Written Opinion issued in European Patent Application No. 21185009.4, dated Dec. 14, 2021, in 11 pages.

(Continued)

*Primary Examiner* — Katrina M Stransky
*Assistant Examiner* — Jared O Brown (57) ABSTRACT

A method of preparing a feed ration for an animal includes storing a cut crop material in an accumulation having an oxygen barrier. The cut crop material is fermented within the accumulation to form a silage material. A nutritive value of the silage material is determined with a nutrition sensor. A desired amount of maceration of the silage material is determined based on the determined nutritive value of the silage material. The silage material is then macerated with a mechanical macerator to achieve the desired amount of maceration. The macerated silage material is then combined with other feed materials to define the feed ration, and may then be fed to the animal.

19 Claims, 3 Drawing Sheets

(56) References Cited

FOREIGN PATENT DOCUMENTS

WO     WO2019243615 A1    12/2019
WO     WO2020050958 A1     3/2020

OTHER PUBLICATIONS

Broderick G. A. et al., Effect of feeding macerated alfalfa silage on nutrient digestibility and milk yield in lactating dairy cows, Journal of Dairy Science, American Dairy Science Association, US, vol. 82, No. 11, Nov. 1, 1999 (Nov. 1, 1999), pp. 2472-2485.
Serrano-Ponce J. G. et al., Influence of mechanical maceration on wheat straw on characteristics of digestion in growing-finishing diets for feedlot cattle, Livestock Science, Elsevier, Amsterdam, NL, vol. 142, No. 1, Jul. 19, 2011 (Jul. 19, 2011), pp. 175-180.

* cited by examiner

SETTING DEGREE OF MACERATION BASED ON FORAGE NUTRITIVE VALUES

TECHNICAL FIELD

The disclosure generally relates to a mechanical macerator and a method of preparing a feed ration for an animal with the mechanical macerator.

BACKGROUND

Forages, such as but not limited to, grasses, legumes, maize, crop residues, etc., are commonly harvested and fed to ruminant animals. One common practice for storing these forage materials is to harvest the forage and place the forage in an oxygen limiting structure, such as a bunker silo, a tightly wrapped bale, or a tower silo. The forage material ferments within the oxygen limiting structure, thereby preserving the forage material. The forage may then be removed and fed to the animals on an as-needed basis. This forage preservation process is often referred to as ensilage, and the forage material is often referred to as silage.

Research has shown that digestibility of forage materials may be improved by extremely processing the forage material prior to feeding the forage material to the animals. This extreme processing is referred to as maceration. Increased digestibility of the forage materials due to maceration increases the amount of nutrients absorbed by the animal for a given volume of forage. The increase in nutrient absorption results in increased production for the given volume of forage, e.g., increased milt production in dairy cattle. However, maceration at the time of harvesting the crop material is not practical because the energy required to macerate the forage material at a volume and speed sufficient to keep up with typical harvesting operations is too great for standard agricultural equipment to supply.

The forage materials are often combined with other feed materials to define a feed ration for an animal. Feed rations may be formulated based on measured nutritive constituents of the forage material. For example. the nutritive constituents of the forage material may include, but are not limited to, Neutral Detergent Fiber (NDF), Acid Detergent Fiber (ADF), Crude Protein (CP), Ash (minerals), etc. It is generally understood by those skilled in the art how much of each nutritive constituent is required, for example, for a cow to produce a given amount of milk. This process is used because nutritive values, e.g., fiber digestibility, changes as the crop material matures. Normally, fiber digestibility decreases as the crop material matures.

SUMMARY

A method of preparing a feed ration for an animal is provided. The method includes storing a cut crop material in an accumulation having an oxygen barrier. The cut crop material is fermented within the accumulation to form a silage material. A nutritive value of the silage material is determined with a nutrition sensor. A desired amount of maceration of the silage material is determined based on the determined nutritive value of the silage material. The silage material is then macerated with a mechanical macerator to achieve the desired amount of maceration. Macerating the silage material includes high intensity crop processing of the silage material resulting in cell wall rupture and the release of intracellular solubles of the silage material.

In one aspect of the disclosure, the silage material that has been macerated to the desired amount of maceration is then mixed with other feed materials to form the feed ration for the animal.

In one aspect of the disclosure, an actual amount of maceration of the silage material achieved by the mechanical macerator is sensed with a macerator sensor. A ration controller may then compare the actual amount of maceration of the silage material to the desired amount of maceration of the silage material to determine if the actual amount of maceration of the silage material is within a defined range of the desired amount of maceration of the silage material, or if the actual amount of maceration of the silage material is not within the defined range of the desired amount of maceration of the silage material. If the ration controller determines that the actual amount of maceration of the silage material is not within the defined range of the desired amount of maceration of the silage material, then the ration controller may adjust the mechanical macerator so that the desired amount of maceration of the silage material is achieved.

In one aspect of the disclosure, the mechanical macerator includes a first processor roll and a second processor roll. The first processor roll and the second processor roll are spaced apart from each other to define a roll gap therebetween. Each of the first processor roll and the second processor roll is rotated at a respective rotational speed to define a differential roll speed therebetween. The step of adjusting the mechanical macerator may include, but is not limited to, moving one of the first processor roll and the second processor roll relative to the other of the first processor roll and the second processor roll to adjust the roll gap therebetween. Additionally, and/or alternatively, the step of adjusting the mechanical macerator may include, but is not limited to, adjusting the respective rotational speed of one of the first processor roll and the second processor roll relative to the other of the first processor roll and the second processor roll to adjust the differential roll speed therebetween.

In one aspect of the disclosure, a respective amount of the other feed materials is calculated to define the feed ration, based on the actual amount of maceration achieved by the mechanical macerator. The macerated silage material may then be combined with the other feed materials to form the feed ration. In one aspect of the disclosure, the silage material is fed to the animal after macerating the silage material, and after the silage material is combined with the other feed materials to form the feed ration.

In one aspect of the disclosure, the oxygen barrier is a plastic covering operable to block transfer of oxygen therethrough.

A mechanical macerator for macerating silage material is also provided. The mechanical macerator includes a first processor roll and a second processor roll arranged in parallel with each other to define a roll gap therebetween. Each of the first processor roll and the second processor roll is operable to rotate at a respective rotational speed to define a differential roll speed therebetween. The first processor roll and the second processor roll are operable to receive silage material through an inlet of the roll gap, macerate the silage material as the silage passes through the roll gap with the first processor roll and the second processor roll rotating at their respective rotational speed, and discharge the silage material through an outlet of the roll gap. A nutrition sensor is positioned adjacent the inlet of the roll gap. The nutrition sensor is operable to sense nutritive levels of the silage material. A ration controller is coupled to the nutrition sensor. The ration controller includes a processor and a memory having a ration algorithm stored thereon. The processor is operable to execute the ration algorithm to receive data from the nutrition sensor indicating the nutritive levels of the silage material. The ration controller may then determine a desired amount of maceration of the silage material based on the nutritive levels of the silage material, and control the roll gap and the respective rotational speed of the first processor roll and the second processor roll to achieve the desired amount of maceration of the silage material.

In one aspect of the disclosure, a macerator sensor is coupled to the ration controller. The macerator is positioned adjacent the outlet of the roll gap. The macerator sensor is operable to sense an actual amount of maceration achieved by the first processor roll and the second processor roll.

The processor is operable to execute the ration algorithm to receive data from the macerator sensor indicating an actual amount of maceration achieved by the first processor roll and the second processor roll. When the actual amount of maceration of the silage material is not within a defined range of the desired amount of maceration of the silage material, the ration controller may then adjust the roll gap and/or the respective rotational speed of the first processor roll and the second processor roll to achieve the desired amount of maceration of the silage material.

In one aspect of the disclosure, the processor is operable to execute the ration algorithm to calculate a respective amount of other feed materials to be combined with the silage material to define a feed ration for an animal. The respective amounts of the other feed materials may be calculated based on the actual amount of maceration achieved by the mechanical macerator.

Macerating the silage material ruptures the plant cell walls, thereby making the Neutral Detergent Fiber (NDF) fraction of the silage material more digestible for the rumen microbes of the animal. For this reason, maceration of the plant cells may reverse the effects of plant maturity on fiber digestibility. In other words, it is possible to improve the fiber digestibility of a mature plant to be similar to the fiber digestibility of an immature plant by macerating the plant cells.

Although macerating the silage material may improve the fiber digestibility of some forages, it is not always advantageous to macerate all forages to the same level. For example, immature forages may require very little or no maceration of the plant cells because the fiber in immature forage may be highly digestible and there is little to be gained by macerating these plants. On the other hand, the fiber digestibility of mature forages may be significantly increased by maceration of the plant cells. By measuring the nutritive values of the silage material, which is based in part on plant maturity, the degree of maceration needed to optimize digestibility for a specific silage material may be determined, and the mechanical macerator may be controlled to provide this desired degree of maceration to optimize feed ration production.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Referring to the Figures, wherein like numerals indicate like parts throughout the several views, a method of preparing a feed ration 20 for an animal 22 is described herein. As understood by those skilled in the art, "silage" is a type of fodder or forage material made from green foliage crops that have been preserved by acidification. The acidification is achieved through a fermentation process. Silage may be fed to ruminant animals 22, such as but not limited to cattle, sheep goats, buffalo, deer, etc. The green foliage crops used to make silage may include, but are not limited to, grasses, alfalfa, maize, sorghum, or other cereal plants. The silage material 38 may be combined with other feed materials 24 to form the feed ration 20. The other feed materials 24 may include, but are not limited to, protein supplements such as soybean meal, and cotton seed, energy supplements such as dry corn, effective fiber supplements such as dry alfalfa hay or grass hay crops, and other minerals and micro nutrients.

The process of preparing the feed ration 20 begins by cutting standing crop material 36 in a field to provide a cut crop material 36. The step of cutting the standing crop material 36 is generally indicated by box 120 in FIG. 1. The standing crop material 36 may be cut using conventional crop mowing equipment, such as but not limited to, a rotary mower, a rotary bar mower, a sickle mower, etc. The mower may be drawn behind or pushed ahead of a vehicle, such as but not limited to an agricultural tractor. Alternatively, the mower may be mounted to a self-propelled windrower. It should be appreciated that the standing crop material 36 may be cut using equipment other than described herein.

After the standing crop material 36 has been cut, the cut crop material 36 may be allowed to dry in the field to achieve a desired initial moisture content. The step of drying the cut crop material 36 in the field is generally indicated by box 122 in FIG. 1. The desired initial moisture content may vary based on the type of crop material 36 and the manner in which the cut crop material 36 is stored, described in greater detail below. Generally, the desired initial moisture content is between 50% and 75%. However, it should be appreciated that the desired initial moisture content may vary from the range described herein.

After allowing the cut crop material 36 to dry to the desired initial moisture content in the field, the cut crop material 36 may be raked into a windrow. The step of raking the cut crop material 36 into a windrow is generally indicated by box 124 in FIG. 1. It should be appreciated that the cut crop material 36 may be formed into the windrow during the cutting process. If the cut crop material 36 is raked into the windrows after drying, the cut crop material 36 may be raked into the windrows using conventional raking equipment, such as but not limited to, a wheel rake, a rotary rake, or a parallel bar or basket rake. The rake may be drawn by a vehicle, such as but not limited to an agricultural tractor. It should be appreciated that the cut crop material 36 may be raked into a windrow using equipment other than described herein.

The cut crop material 36 may then be collected in the field. The step of collecting the cut crop material 36 in the field is generally indicated by box 126 in FIG. 1. The cut crop material 36 may be collected from the field using conventional equipment, such as but not limited to, a forage harvester and a trailer. The trailer may be drawn by another vehicle, such as but not limited to a tractor. The forage harvester gathers the cut crop material 36 up from the field, and moves the cut crop material 36 through a discharge chute, which discharges the cut crop material 36 into the trailer. Once loaded into the trailer, the cut crop material 36 may be moved to another location for storage.

Figure 1:
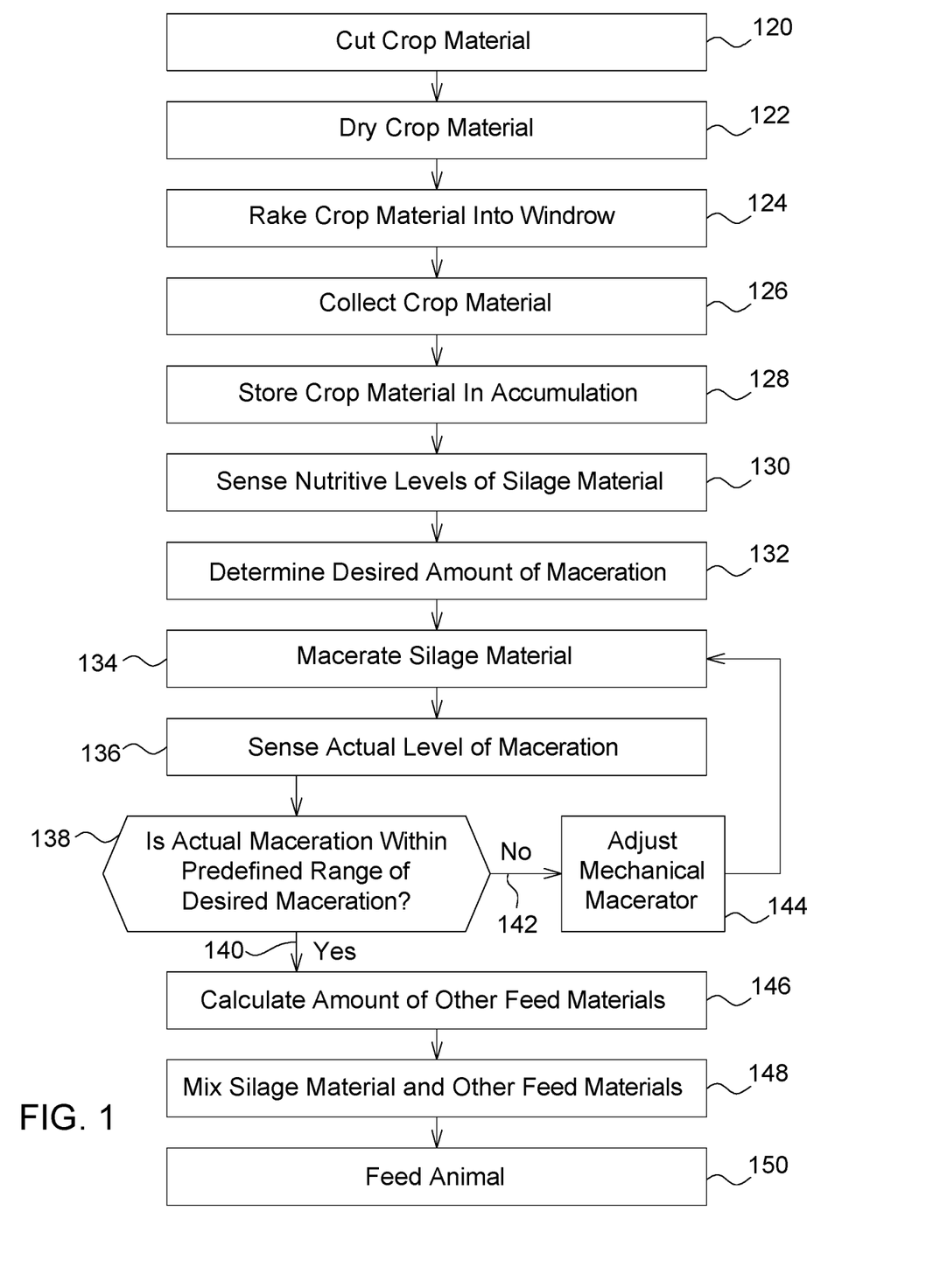
FIG. 1 is a flowchart representing a method of preparing a feed ration for an animal.

In addition to collecting the cut crop material 36, the forage harvester may include a crop processing unit that chops or further cuts the crop material 36 into smaller pieces. As such, the cut crop material 36 may be further cut or chopped while collecting the cut crop material 36 in the field. It should be appreciated that the cut crop material 36 may be collected from the field using equipment other than described herein.

Figure 2:
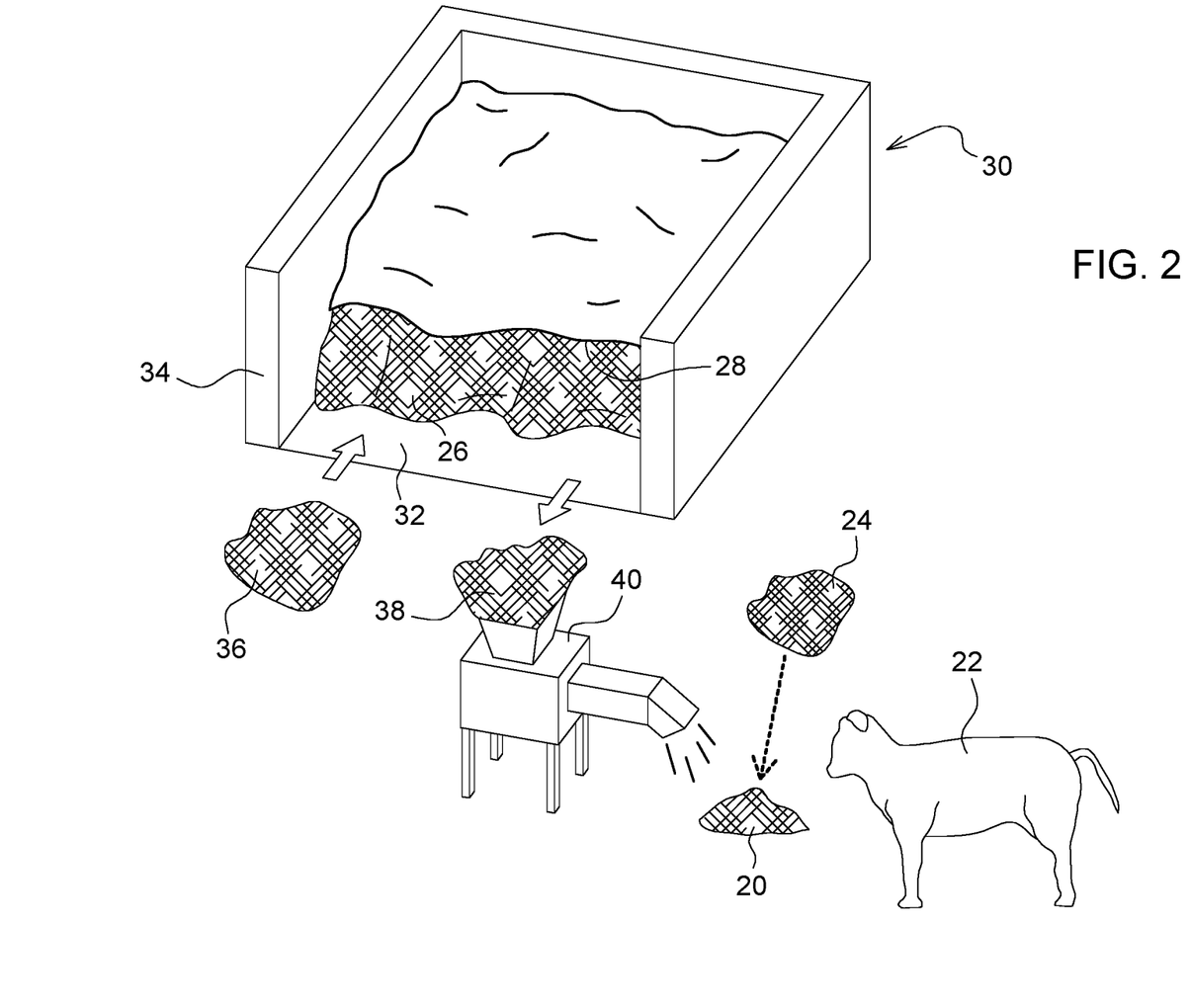
FIG. 2 is a schematic perspective view showing a bunker silo with a mechanical macerator.

Referring to FIG. 2, the cut crop material 36 may then be stored in an accumulation 26 having an oxygen barrier 28. The step of storing the cut crop material 36 in the accumulation 26 is generally indicated by box 128 in FIG. 1. The accumulation 26 may include configuration that restricts or limits oxygen infiltration into the accumulation 26. For example, the accumulation 26 may include a pile of crop material 36 disposed in a bunker silo 30 (shown in FIG. 2), a pile of crop material 36 stored in a tower silo, or a compressed bale. As is understood by those skilled in the art, a bunker silo 30 generally includes a concrete floor 32 with walls 34 formed on three sides. The cut crop material 36 is piled onto the concrete floor 32 in layers and then compressed to remove as much air from the cut crop material 36 in the bunker silo 30 as reasonably possible. After the cut crop material 36 is compressed, the pile or accumulation 26 of the cut crop material 36 is covered with the oxygen barrier 28. As is understood by those skilled in the art, the cut crop material 36 may be formed into a compressed bale. The bale may be formed into a shape, such as but not limited to a parallelepiped rectangular shape, e.g., a large square bale, or a cylindrical shape, e.g., a round bale. The cut crop material 36 may be formed into the compressed bale using a round baler, a large square baler, or some other similar baler know to those skilled in the art. Once formed and bound into the bale, the cut crop material 36 may then be wrapped with the oxygen barrier 28 as is known in the art. A tower silo may alternatively be used, in which the tower silo fully encloses the crop material 36 and also acts as the oxygen barrier 28 to by blocking air from the crop material 36 within the tower silo.

The oxygen barrier 28 may include a product that is capable substantially blocking or limiting the flow of air. In one implementation, the oxygen barrier 28 is a plastic covering operable to block transfer of oxygen therethrough. The plastic covering may include, but is not limited to, a polyethylene plastic or other similar or equivalent plastic covering. In other embodiments, the oxygen barrier 28 is a wall or roof of a structure that blocks transfer or passage of air and/or oxygen therethrough.

With the cut crop material 36 disposed in the accumulation 26 and covered with the oxygen barrier 28, the cut crop material 36 will ferment within the accumulation 26 to form a silage material 38. The fermentation process of silage is understood by those skilled in the art. Generally described, the fermentation process involves both aerobic bacteria (oxygen needed) and anaerobic bacteria (no oxygen needed). Aerobic fermentation occurs when the cut crop material 36 is positioned in the accumulation 26 and/or immediately thereafter, i.e. placed in the bunker silo 30 or formed into the bale. The aerobic fermentation consumes what oxygen is available in the accumulation 26. After the aerobic fermentation has consumed the oxygen in the accumulation 26, then the anaerobic fermentation occurs. The complete fermentation process may take approximately four weeks to complete, after which the silage material 38 may be stored in the accumulation 26 in a generally stable condition for an extended period of time, assuming the introduction of oxygen into the accumulation 26 is substantially prevented during the extended storage.

Figure 3:
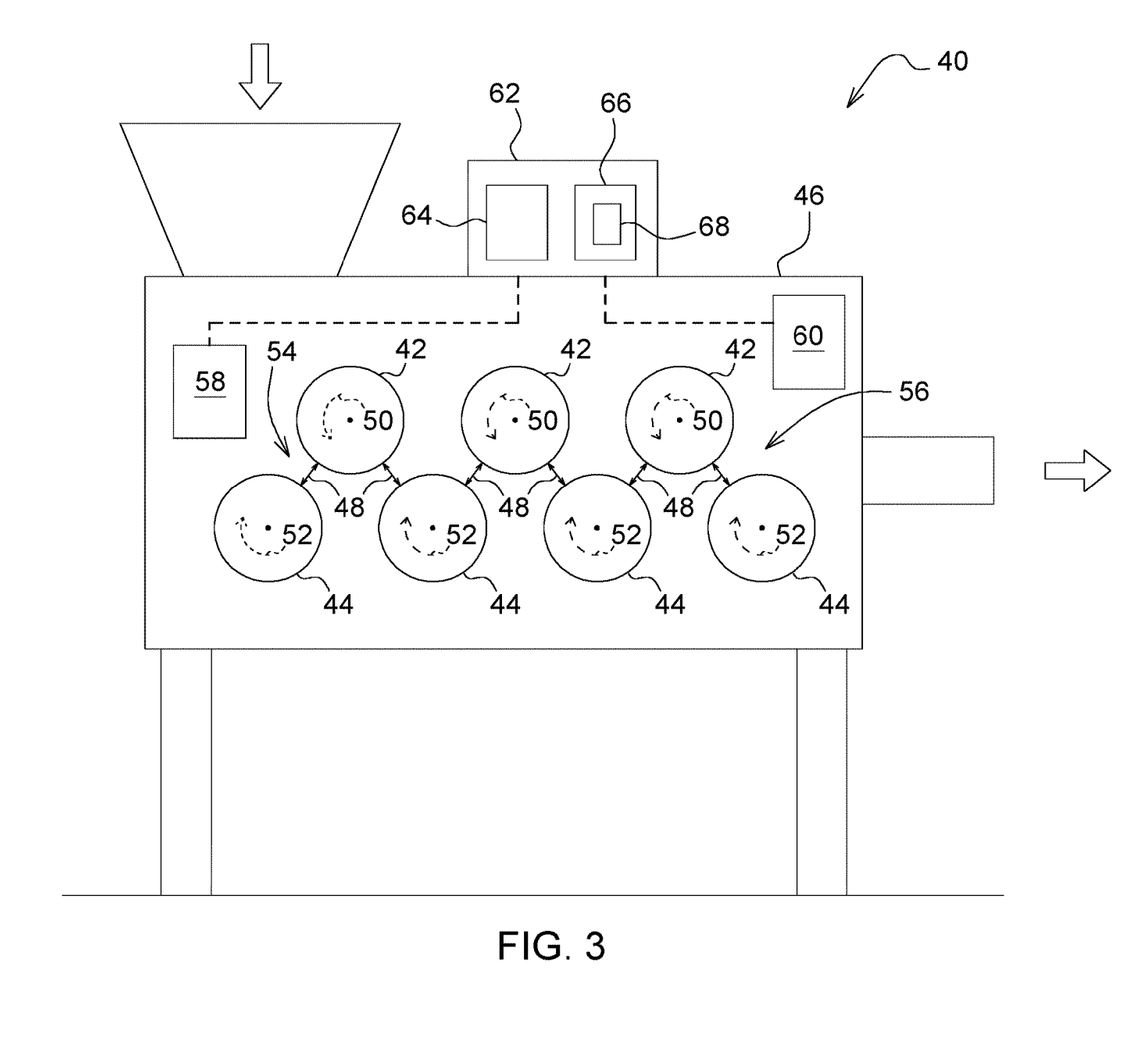
FIG. 3 is a schematic side view of the mechanical macerator.

After fermentation, the silage material 38 is macerated. The silage material 38 is macerated with a mechanical macerator 40. The mechanical macerator 40 is generally shown in FIG. 2. The mechanical macerator 40 may include, but is not limited to, a hammer mill, a crushing impact macerator, an opposing plate/belt style macerator, or a differential roll macerator. An example implementation of the mechanical macerator 40 is generally shown in FIG. 3 as a differential roll macerator. However, it should be appreciated that the construction and operation of the mechanical macerator 40 may differ from the example implementation shown in FIG. 3.

As understood by those skilled in the art, "macerating" or "maceration" is a highly intensive mechanical crop conditioning process in which the physical structure of plant stems are broken down and split into numerals pieces while the leaves and upper stem segments are crushed and pureed, resulting in significant cell wall rupture and the release of intracellular solubles. For example, the degree of cell wall rupture for macerated silage material 38 may be between 40% and 80%. As is understood by those skilled in the art, maceration is a much more intensive and extreme form of crop processing than the typical crop conditioning that occurs in traditional crop conditioning units commonly disposed on mowers and other crop cutting implements. As such, it should be appreciated that the maceration of the silage material 38 described herein is different and more extensive than, and is not the equivalent of, a typical crop conditioning process that may occur at the time of cutting the crop material 36 that is intended to be dried and made into dry hay or the like. A typical crop conditioning process, such as provided by a mower conditioner or other similar apparatus, typically provides less than 5-10% cell rupture, which is far less than the level of maceration described herein.

The mechanical macerator 40 may include a device that macerates the silage material 38 through a mechanical process, such as but not limited to, beating, chipping, crushing, bending, cracking, scraping, or shearing the silage material 38. The mechanical macerator 40 may include, for example, one or more macerating plates or rollers that move relative to each other, and pass the silage material 38 therebetween, whereby the silage material 38 is macerated. The mechanical macerator 40 may include a power input, such as but not limited to a rotary power input that drives a gear train, or an electric input that drives an electric motor, a hydraulic input that drives a hydraulic motor etc. The power input in turn drives the macerating plates and/or rollers for macerating the silage material 38. It should be appreciated that the mechanical macerator 40 may include other components not described herein, and that the specific construction, configuration, and operation of the mechanical macerator 40 may vary from the example implementation shown in the Figures and described herein.

Referring to FIG. 3, an example implementation of the mechanical macerator 40 is generally shown. The example implementation of the mechanical macerator 40 includes a first processor roll 42 and a second processor roll 44. In the example implementation shown in FIG. 3 and described herein, the mechanical macerator 40 includes a plurality of first processor rolls 42, and a plurality of second processor rolls 44. However, it should be appreciated that the example implementation of the mechanical macerator 40 may be implemented with only a single first processor roll 42 and a single second processor roll 44.

The first processor roll 42 and a second processor roll 44 are rotatably attached to a frame 46 and are arranged in parallel with each other. The first processor roll 42 and the second processor roll 44 are spaced apart from each other to define a roll gap 48 therebetween. At least one of the first processor roll 42 and the second processor roll 44 is moveable relative to the other of the first processor roll 42 and the second processor roll 44 to change or adjust the roll gap 48 therebetween. The first processor roll 42 and the second processor roll 44 may be attached to and supported by the frame 46 in a suitable manner. Additionally, at least one of the first processor roll 42 and the second processor roll 44 may include an adjustment mechanism attaching it to the frame 46 to enable relative movement therebetween to adjust the roll gap 48. The specific construction and operation of the adjustment mechanism are not pertinent to the teachings of this disclosure, are understood by those skilled in the art, and are therefore not described in detail herein.

Each of the first processor roll 42 and the second processor roll 44 are rotatable about a respective central longitudinal axis. The first processor roll 42 and the second processor roll 44 may be configured to rotate in opposite rotational directions. For example, the first processor roll 42 may be configured to rotate in a counter-clockwise direction 52 as viewed on the page of FIG. 3, whereas the second processor roll 44 may be configured to rotate in a clockwise direction as viewed on the page of FIG. 3. Each of the first processor roll 42 and the second processor roll 44 are operable to rotate at a respective rotational speed. As such, the first processor roll 42 may rotate at a first rotational speed, and the second processor roll 44 may rotate at a second rotational speed that is different from the first rotational speed. The difference between the first rotational speed and the second rotational speed defines a differential roll speed.

The first processor roll 42 and the second processor roll 44 are operable to receive the silage material 38 through an inlet 54 of the roll gap 48, and macerate the silage material 38 as the silage passes through the roll gap 48 with the first processor roll 42 and the second processor roll 44 rotating at their respective rotational speeds. The amount of maceration of the silage material 38 is dependent, at least partially, upon the distance of the roll gap 48 and the differential roll speed between the first processor roll 42 and the second processor roll 44. The silage material 38 is discharged from the roll gap 48 through an outlet 56 of the roll gap 48.

A nutrition sensor 58 is positioned adjacent the inlet 54 of the roll gap 48. The nutrition sensor 58 is operable to sense data related to nutritive levels of the silage material 38. The nutritive levels or values of the silage material 38 may include, but are not limited to, a Neutral Detergent Fiber (NDF) value, an Acid Detergent Fiber (ADF) value, a Crude Protein (CP) value, and an Ash or mineral content value. It should be appreciated that the nutrition sensor 58 may sense data related to these or other nutritive values which may then be used to determine or calculate the actual nutritive values. Alternatively, the nutrition sensor 58 may sense the actual nutritive values directly. The nutrition sensor 58 may include any sensor or combination of sensors, test equipment, chemicals, cameras, etc., necessary to sense the data related to the nutritive levels. The specific configuration and operation of the nutrition sensor 58 is dependent upon the specific types of nutritive values sensed, are understood by those skilled in the art, and are therefore not described in detail herein.

The mechanical macerator 40 further includes a macerator sensor 60. The macerator sensor 60 is positioned adjacent to the outlet 56 of the roll gap 48. The macerator sensor 60 is operable to sense data related to an actual amount of maceration achieved by the first processor roll 42 and the second processor roll 44. The macerator sensor 60 may sense data related to the actual amount of maceration that may then be used to determine or calculate the actual amount of maceration achieved, or may directly sense the actual amount of maceration achieved. The macerator sensor 60 may include, for example, a camera or other similar device that captures and image of the silage material 38 exiting the roll gap 48. The image may then be analyzed by a ration controller 62 to determine the actual amount of maceration of the silage material 38. It should be appreciated that the macerator sensor 60 may be implemented in some other manner not shown or described herein.

The ration controller 62 is coupled to and in communication with the nutrition sensor 58 and the macerator sensor 60. Additionally, the ration controller 62 is operable to control and/or adjust the roll gap 48 and the differential roll speed. The ration controller 62 may alternatively be referred to as a computing device, a computer, a controller, a control module, a module, etc. The ration controller 62 is operable to receive data from the nutrition sensor 58 and the macerator sensor 60, and control the operation of the first processor roll 42 and the second processor roll 44. The ration controller 62 includes a processor 64, a memory 66, and all software, hardware, algorithms, connections, sensors, etc., necessary to manage and control the operation of the mechanical macerator 40. As such, a method may be embodied as a program or algorithm operable on the ration controller 62. It should be appreciated that the ration controller 62 may include any device capable of analyzing data from various sensors, comparing data, making the necessary decisions required to control the operation of the mechanical macerator 40 and executing the required tasks necessary to control the operation of the mechanical macerator 40.

As used herein, "controller" is intended to be used consistent with how the term is used by a person of skill in the art, and refers to a computing component with processing, memory 66, and communication capabilities, which is utilized to execute instructions (i.e., stored on the memory 66 or received via the communication capabilities) to control or communicate with one or more other components. In certain embodiments, a controller may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The ration controller 62 may be in communication with other components on the mechanical macerator 40, such as hydraulic components, electrical components, input devices, etc. The ration controller 62 may be electrically connected to these other components by a wiring harness such that messages, commands, and electrical power may be transmitted between the ration controller 62 and the other components. Although the ration controller 62 is referenced in the singular, in alternative embodiments the configuration and functionality described herein can be split across multiple controllers using techniques known to a person of ordinary skill in the art.

The ration controller 62 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 66 may include any non-transitory/tangible medium which participates in providing data or computer-readable instructions. The memory 66 may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The ration controller 62 includes the tangible, non-transitory memory 66 on which are recorded computer-executable instructions, including a ration algorithm 68. The processor 64 of the ration controller 62 is configured for executing the ration algorithm 68. The ration algorithm 68 implements a method of macerating the silage material 38.

The ration controller 62 receives data from the nutrition sensor 58 related to the nutritive levels of the silage material 38 entering the mechanical macerator 40 through the inlet 54 of the roll gap 48. The step of sensing the data related to the nutritive levels of the silage material 38 is generally indicated by box 130 in FIG. 1. The nutrition sensor 58 sensors data related to the nutritive levels or values of the silage material 38 prior to the silage material 38 being macerated. The ration controller 62 may use the data from the nutrition sensor 58 to calculate or otherwise determine the actual nutritive values of the silage material 38 prior to maceration.

Once the ration controller 62 knows the nutritive levels of the silage material 38, the ration controller 62 may determine a desired amount of maceration of the silage material 38 based on the nutritive levels of the silage material 38. The step of determining the desired amount of maceration of the silage material 38 is generally indicated by box 132 in FIG. 1. The desired amount of maceration of the silage material 38 is dependent at least upon the actual nutritive values of the silage material 38 and the animal 22 to which the feed ration 20 is to be fed. For example, immature silage material 38 may require little maceration to achieve a desired feed quality, whereas very mature silage material 38 may require significant maceration to achieve the desired feed quality.

Once the ration controller 62 has determined the desired amount of maceration for the silage material 38, the ration controller 62 may position or control the roll gap 48 and the respective rotational speeds of the first processor roll 42 and the second processor roll 44 to an initial setting or position to achieve the desired amount of maceration of the silage material 38. The amount of maceration increases with a decrease in the distance of the roll gap 48. Additionally, the amount of maceration increases with an increase in the differential roll speed. The initial setting for the roll gap 48 and the differential roll speed may be dependent upon the specific configuration of the mechanical macerator 40, the type of crop material 36, etc. The ration controller 62 may maintain a plurality of different pre-defined initial settings for the roll gap 48 and the differential roll speed to achieve different levels of maceration in the memory 66.

Once the first processor roll 42 and the second processor roll 44 are positioned in their initial settings to achieve the desired amount of maceration of the silage material 38, the silage material 38 is fed into the mechanical macerator 40 through the inlet 54 of the roll gap 48 and macerated. The step of macerating the silage material 38 is generally indicated by box 134 in FIG. 1. The silage material 38 is discharged through the outlet 56 of the roll gap 48 after being macerated by the first processor roll 42 and the second processor roll 44.

The ration controller 62 receives data from the macerator sensor 60 related to an actual amount of maceration achieved by the first processor roll 42 and the second processor roll 44. The step of sensing data related to the actual amount of maceration achieved is generally indicated by box 136 in FIG. 1. As described above, the macerator sensor 60 may sense an actual amount of maceration, or sense data that may be used to calculate or determine the actual amount of maceration of the silage material 38.

The ration controller 62 may then compare the actual amount of maceration of the silage material 38 to the desired amount of maceration of the silage material 38 to determine if the actual amount of maceration of the silage material 38 is within a defined range of the desired amount of maceration of the silage material 38, or if the actual amount of maceration of the silage material 38 is not within the defined range of the desired amount of maceration of the silage material 38. The step of comparing the actual maceration to the desired maceration is generally indicated by box 138 in FIG. 1. The defined range may include a range above and/or below the desired amount of maceration of the silage material 38. A level of maceration within the defined range indicates an acceptable level of maceration. A level of maceration above or greater than the defined range may indicate excessive or unnecessary amounts of maceration. A level of maceration below or less than the defined range may indicate an unacceptable or insufficient amount of maceration.

If the ration controller 62 determines that the actual level of maceration of the silage material 38 achieved by the mechanical macerator 40 is within the defined range of the desired amount of maceration, generally indicated at 140 then the roll gap 48 and/or the differential roll speed do not need to be adjusted, and the mechanical macerator 40 may continue operation at the initial settings.

If the ration controller 62 determines that the actual level of maceration of the silage material 38 achieved by the mechanical macerator 40 is not within the defined range of the desired amount of maceration, generally indicated at 142, then the ration controller 62 may adjust the mechanical macerator 40, i.e., adjust the roll gap 48 and/or the differential roll speed, to an adjusted setting to bring the actual level of maceration achieved by the mechanical macerator 40 into the defined range of the desired amount of maceration. The step of adjusting the mechanical macerator 40 is generally indicated by box 144 in FIG. 1. This process may be repeated until the actual level of maceration achieved by the mechanical macerator 40 is within the defined range of the desired amount of maceration. It should be appreciated that the step of adjusting the mechanical macerator 40 may include other processes not specifically described in detail herein, and which are dependent upon the specific type and style of macerator being used. Examples of adjusting the mechanical macerator may include, but are not limited to, adjusting a time of maceration, adjusting a speed of maceration, adjusting a number of engaged macerators, adjusting a crush pressure, etc. For example, adjusting the mechanical macerator 40 may include, but is not limited to, macerating the forage material for a longer period of time until the desired amount of maceration is achieved.

As noted above, the mechanical macerator 40 may be adjusted by changing the roll gap 48 and/or by changing the differential roll speed. In order to change the roll gap 48, one of the first processor roll 42 and the second processor roll 44 is moved relative to the other of the first processor roll 42 and the second processor roll 44 to adjust the roll gap 48 therebetween. In order to adjust the differential roll speed, the respective rotation speed of one of the first processor roll 42 and the second processor roll 44 is changed relative to the other of the first processor roll 42 and the second processor roll 44.

Once the desired amount of maceration is achieved by the mechanical macerator 40, generally indicated at 140, the ration controller 62 may calculate a respective amount of other feed materials 24 to be combined with the silage material 38 to define the feed ration 20 for the animal 22 based. The step of calculating the respective amounts of the other feed materials 24 is generally indicated by box 146 in FIG. 1.

Once the respective amounts of the other feed materials 24 is calculated, the macerated silage material 38 may be mixed with the other feed materials 24 to form the feed ration 20 for the animal 22. The step of mixing the silage material 38 with the other feed materials 24 is generally indicated by box 148 in FIG. 1. After mixing the silage material 38 with the other feed materials 24, the feed ration 20 may then be fed to an animal 22. The step of feeding the animal 22 is generally indicated by box 150 in FIG. 1.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of preparing a feed ration for an animal, the method comprising:
   determining a nutritive value of a silage material with a nutrition sensor positioned relative to a macerating mechanism of a mechanical macerator;
   determining a desired amount of maceration of the silage material based on the determined nutritive value of the silage material; and
   macerating the silage material with the mechanical macerator to achieve the desired amount of maceration.

2. The method set forth in claim 1, further comprising mixing the silage material macerated to the desired amount of maceration with other feed materials to form the feed ration for the animal.

3. The method set forth in claim 1, wherein macerating the silage material includes high intensity crop processing of the silage material resulting in cell wall rupture and the release of intracellular solubles of the silage material.

4. The method set forth in claim 1, further comprising sensing an actual amount of maceration of the silage material achieved by the mechanical macerator with a macerator sensor.

5. The method set forth in claim 4, further comprising comparing the actual amount of maceration of the silage material to the desired amount of maceration of the silage material with a ration controller to determine if the actual amount of maceration of the silage material is within a defined range of the desired amount of maceration of the silage material, or if the actual amount of maceration of the silage material is not within the defined range of the desired amount of maceration of the silage material.

6. The method set forth in claim 5, further comprising adjusting the mechanical macerator, when the actual amount of maceration of the silage material is not within the defined range of the desired amount of maceration of the silage material.

7. The method set forth in claim 6, wherein adjusting the mechanical macerator includes adjusting a time of maceration of the silage material until the desired amount of maceration is achieved.

8. The method set forth in claim 6, wherein the mechanical macerator includes a first processor roll and a second processor roll spaced apart from each other to define a roll gap therebetween, and wherein the step of adjusting the mechanical macerator includes moving one of the first processor roll and the second processor roll relative to the other of the first processor roll and the second processor roll to adjust the roll gap therebetween.

9. The method set forth in claim 6, wherein the mechanical macerator includes a first processor roll and a second processor roll each rotated at a respective rotational speed to define a differential roll speed therebetween, and wherein the step of adjusting the mechanical macerator includes adjusting the respective rotation speed of one of the first processor roll and the second processor roll relative to the other of the first processor roll and the second processor roll to adjust the differential roll speed therebetween.

10. The method set forth in claim 1, further comprising feeding the silage material to an animal after macerating the silage material.

11. The method set forth in claim 1, further comprising storing a cut crop material in an accumulation having an oxygen barrier.

12. The method set forth in claim 11, wherein the oxygen barrier is a plastic covering operable to block transfer of oxygen therethrough.

13. The method set forth in claim 11, further comprising fermenting the cut crop material within the accumulation to form the silage material.

14. A mechanical macerator for macerating silage material, the mechanical macerator comprising:
 a macerating mechanism operable to macerate the silage material;
 a nutrition sensor positioned relative to the macerating mechanism and operable to sense nutritive levels of the silage material;
 a ration controller coupled to the nutrition sensor, and including a processor and a memory having a ration algorithm stored thereon, wherein the processor is operable to execute the ration algorithm to:
 receive data from the nutrition sensor indicating the nutritive levels of the silage material;
 determine a desired amount of maceration of the silage material based on the nutritive levels of the silage material;
 control the macerating mechanism to achieve the desired amount of maceration of the silage material.

15. The mechanical macerator set forth in claim 14, further comprising a macerator sensor coupled to the ration controller, wherein the macerator sensor is operable to sense an actual amount of maceration achieved by the macerating mechanism.

16. The mechanical macerator set forth in claim 15, wherein the processor is operable to execute the ration algorithm to receive data from the macerator sensor indicating an actual amount of maceration achieved by the macerating mechanism.

17. The mechanical macerator set forth in claim 16, wherein the processor is operable to execute the ration algorithm to adjust the macerating mechanism when the actual amount of maceration of the silage material is not within a defined range of the desired amount of maceration of the silage material.

18. The mechanical macerator set forth in claim 16, wherein the macerating mechanism includes a first processor roll and a second processor roll arranged in parallel with each other to define a roll gap therebetween, with each of the first processor roll and the second processor roll operable to rotate at a respective rotational speed to define a differential roll speed therebetween, wherein the first processor roll and the second processor roll are operable to receive silage material through an inlet of the roll gap, macerate the silage material as the silage passes through the roll gap with the first processor roll and the second processor roll rotating at their respective rotational speed, and discharge the silage material through an outlet of the roll gap.

19. The mechanical macerator set forth in claim 18, wherein the processor is operable to execute the ration algorithm to adjust the roll gap and the respective rotational speed of the first processor roll and the second processor roll when the actual amount of maceration of the silage material is not within a defined range of the desired amount of maceration of the silage material.

* * * * *